Feb. 16, 1965    M. S. WOOSNAM ETAL    3,169,348
EGG CLEANING APPARATUS
Filed Nov. 21, 1962    4 Sheets-Sheet 2
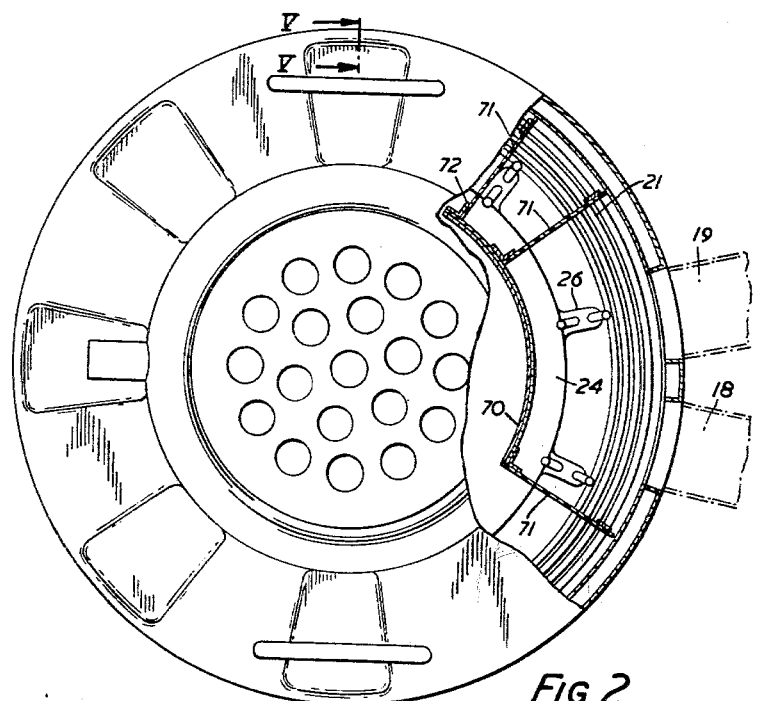
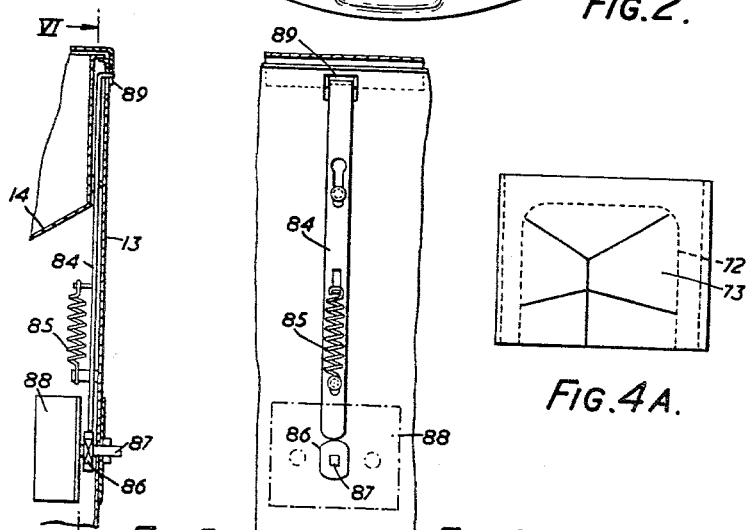
INVENTORS
MAXWELL SEELY WOOSNAM
DAVID JOHN CAPRON
BY
Hane and Nydick
ATTORNEYS

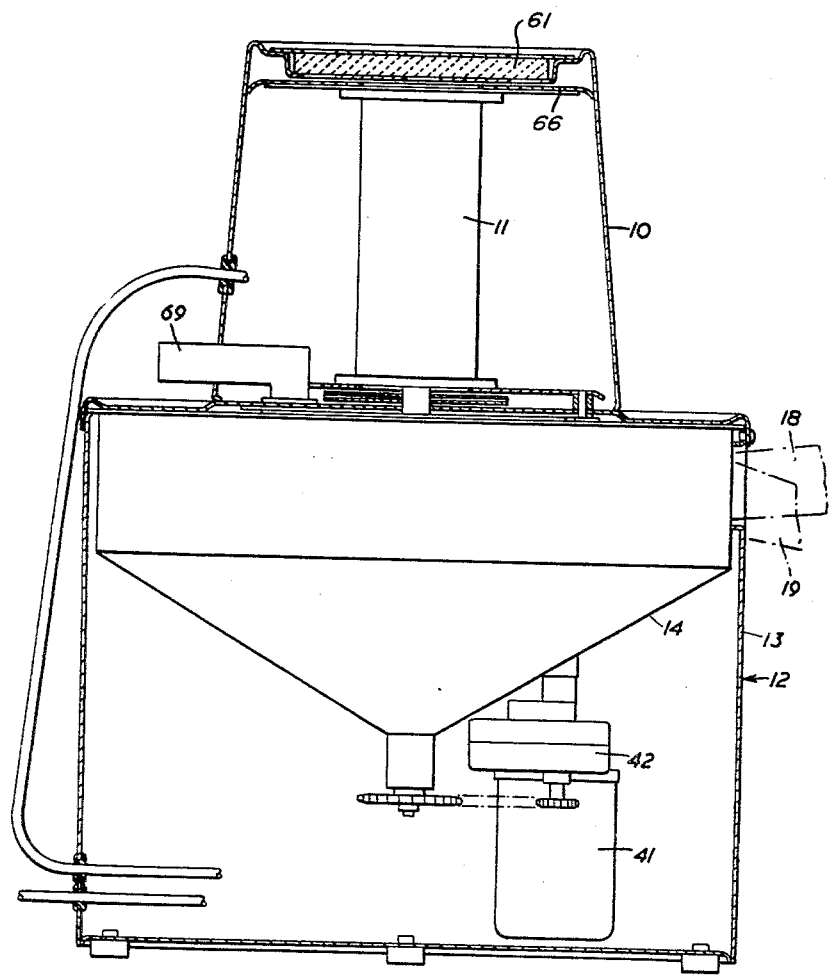
FIG./.

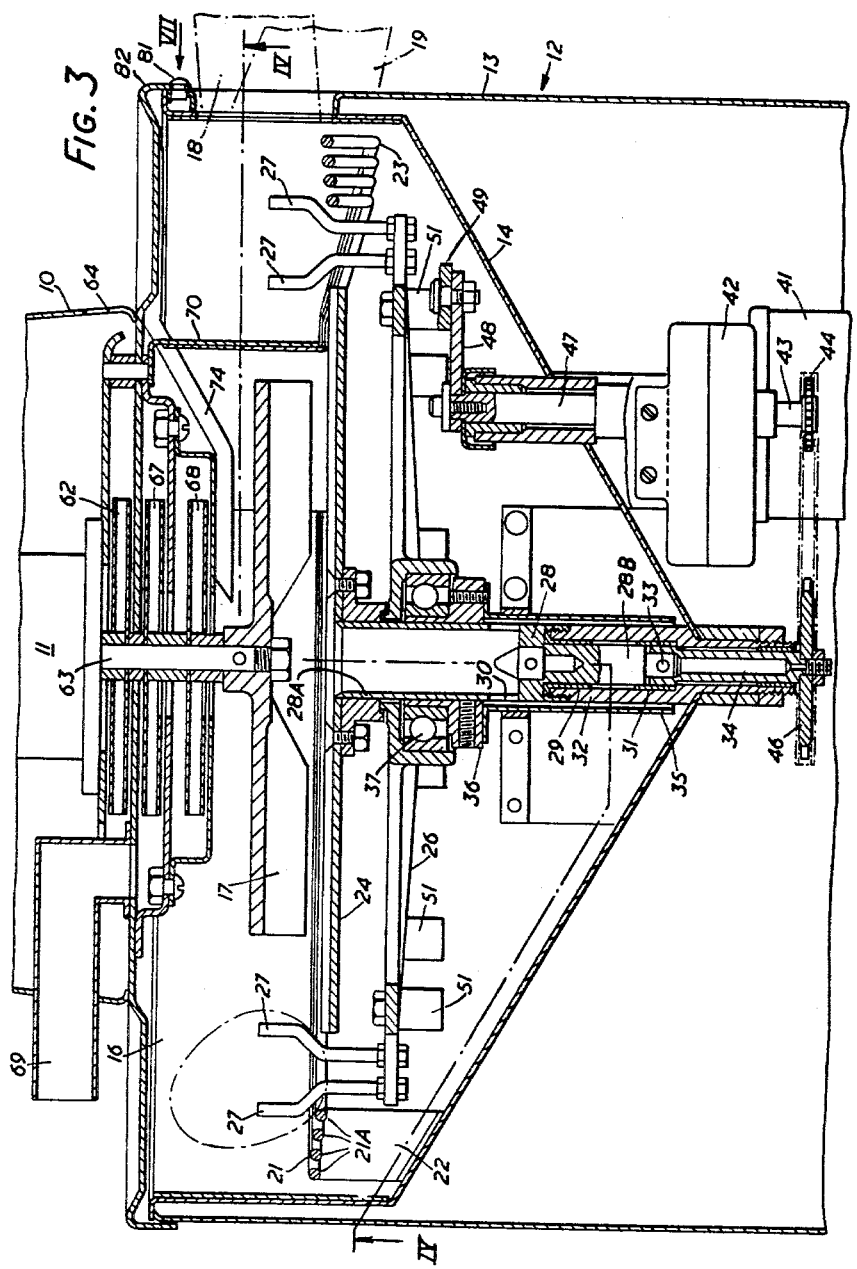

INVENTORS
MAXWELL SEELY WOOSNAM
DAVID JOHN CAPRON

BY
ATTORNEYS

United States Patent Office 3,169,348
Patented Feb. 16, 1965

3,169,348
EGG CLEANING APPARATUS
Maxwell Seely Woosnam, London, and David John Capron, Suffolk, England, assignors to Capewell Developments Limited, London, England
Filed Nov. 21, 1962, Ser. No. 239,158
Claims priority, application Great Britain, Nov. 23, 1961, 41,956/61
5 Claims. (Cl. 51—9)

This invention relates to cleaning machines. The preferred form of the invention, described herein, is a machine which is primarily intended for the cleaning of eggs, but it will be apparent that machines in accordance with the invention could be used or readily adapted for the cleaning of other articles.

In accordance with the present invention a cleaning machine comprises a chamber, conveyor means for moving an egg or other article along a path within the chamber, and propulsive means for producing a flow of abrasive particles directed at an article in motion along the path.

Figure 4:
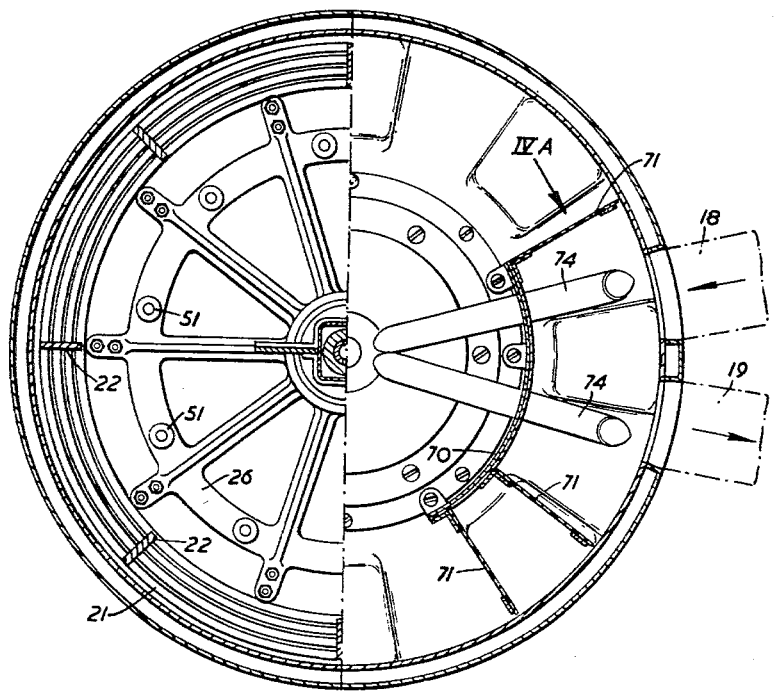
Figure 7:
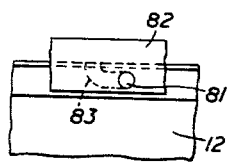

Features of the invention will become clear from the following description of an egg cleaning machine constructed in accordance therewith, the machine being illustrated in the accompanying drawings in which:

FIGURE 1 is a part sectional elevation of the machine;
FIGURE 2 is a plan view, partly broken away;
FIGURE 3 is a sectional elevation, on a larger scale, showing some of the mechanisms of the machine;
FIGURE 4 is a view on the line IV—IV of FIGURE 3, some parts being omitted for clarity;
FIGURE 4A is a view on the arrow IVA of FIGURE 4;
FIGURE 5 is a view on the line V—V of FIGURE 2;
FIGURE 6 is a view on the line VI—VI of FIGURE 5; and
FIGURE 7 is a partial view on the arrow VII of FIGURE 3.

The machine shown in the drawings comprises an upper casing part 10 which houses an impeller motor 11, and a lower casing part 12 having a cylindrical outer wall 13 and a generally conical inner wall 14 which, with the upper casing part defines a cleaning chamber 16. Within this chamber are disposed a horizontal rotary conveyor and propulsive means in the form of a centrifugal impeller 17 which in operation produces a cleaning flow of abrasive particles towards eggs in motion on the conveyor. The conical wall 14 acts as a reservoir or collector for abrasive particles, collecting particles which, having been thrown outwardly by the conveyor, have lost their kinetic energy and fall into the collector, from which they are returned to the impeller 17 for recirculation. The wall of the chamber 16 is provided with inlet and outlet openings through which eggs pass from and to inlet and outlet gravity chutes, 18 and 19, in being loaded onto and unloaded from the conveyor.

Conveyor

The rotary conveyor comprises a stationary, annular support or track 21 composed of a plurality of wires 21A supported from the conical wall 14 by means of brackets 22. The wires are arranged so that the track 21 has a concave upper surface over the major part of its length, the remaining part being dipped downwardly outwardly in the region of the outlet opening. This dipped region of the track is indicated by the reference numeral 23 in FIGURE 3. The conveyor further comprises a rotary disc or turn-table 24 which is mounted concentrically with the track 21 for rotation about the vertical axis of the machine. The outer edge of the disc 24 is spaced inwardly from, and slightly below the inner edge of the track 21. The conveyor also comprises a spider 26 which is journalled about the vertical axis of the machine and carries ten egg engaging members or fingers 27 which are equally spaced about the periphery of the spider and project upwardly through the gap between the inner edge of the track 21 and the outer edge of the rotary disc 24.

The rotary disc 24 is fast with a drive shaft 28 whose upper portion 28A is hollow, opening to the upper surface of the disc, and whose solid lower portion 28B is journalled in bearings 29 and 31 mounted in a bearing housing 32 which is secured to the conical inner wall 14. The lower shaft portion 28B is releasably keyed by means of a pin and slot connection 33 to a sprocket shaft 34 which is also journalled in the bearing housing 32.

A part of the bearing housing is surrounded by a sleeve 35 of square cross-section, whose function will be described below. The interior of the sleeve communicates with the interior of the hollow shaft portion 28A by way of apertures 20. The sleeve is secured to a collar 36 in turn secured to the upper portion 28A of the drive shaft. The collar 36 mounts a ball bearing 37 upon which the spider 26 is mounted for rotation relative to the drive shaft 28. It will be noted that the entire assembly consisting of the disc 24, drive shaft 28, sleeve 34, collar 36, bearing 37 and spider 26, can be released and removed by a simple upward movement relative to the lower casing part.

For driving the rotary disc 24 and the spider 26, there is provided an electric motor 41 and gearbox 42. One gearbox shaft 43 carries a sprocket 44 connected by a chain to a sprocket 46 carried by the sprocket shaft 34, to drive the rotary disc continuously at a speed of 24 revolutions per minute.

A second gearbox shaft 47 extends through the conical wall 14 and at its upper end carries a radial arm 48 at whose outer end is rotatably mounted a roller 49, which is engageable with a plurality of studs 51 carried by the spider 26. The radial arm 48 and the studs 51 are so arranged that as the arm rotates the roller 49 will engage one of the studs 51 and so move the spider angularly about its vertical axis. As rotation of the arm continues the roller will become disengaged from that stud and leave the spider at a position of rest until during the following revolution of the arm 48 the roller will engage the next following stud to move the spider once more. In this way continuous rotation of the arm 48 produces intermittent angular displacement of the spider 26. In this embodiment the spider is moved through an arc of approximately 36° eight times per minute.

Impeller and motor housing

As best seen in FIGURES 1 and 3, the upper casing part 10 houses an electric motor 11 for driving the impeller 17 about a vertical axis at a speed of 6500 revolutions per minute. Both ends of the motor are open for ventilation, air being drawn in through the top of the casing, through a filter 61 and so through the motor, by means of a fan 62 mounted on the impeller shaft 63. The exhaust from the fan 62 escapes to atmosphere through slots 64 in the upper casing. Recirculation of air through the filter is prevented by a baffle 66 across the upper end of the casing.

Also mounted on the impeller shaft 63 are the fans 67, 68, of a two stage fan whose function is to draw dust laden air from the cleaning chamber 16 and exhaust it to atmosphere or to a suitable receptacle through a tube or tubes 69.

In operation of the impeller 17, abrasive particles in the collector formed by the conical wall 14 are entrained in air and drawn upwardly into the suction zone of the impeller through the gap between the bearing housing 32 and sleeve 35, through apertures 30, and the interior of the hollow shaft portion 28A. Particles are then thrown outwardly by the impeller, across the conveyor, in a steady flow which is effective to clean eggs in motion on the conveyor. Particles of abrasive material which have lost their kinetic energy fall downwardly through the track 21 and the gap between the track and the disc 24 and so back to the bottom of the conical wall 14.

In order to prevent the egress of abrasive particles through the inlet and outlet openings of the cleaning chamber 16, the upper casing carries an arcuate shield 70 and three baffles 71, best seen in FIGURE 4, which extend radially across the conveyor between the shield 70 and the wall of the cleaning chamber. As illustrated in FIGURE 4A, each baffle comprises a rigid U-shaped support 72 and a sheet of flexible, resilient sheet material 73, which is cut to form a plurality of flaps which can yield to the pressure of an egg passing along the conveyor and close behind the egg due to the resilience of the material of which they are formed. Two baffles are positioned before the outlet opening to ensure the exclusion of particles, and one after the inlet, although two baffles may be positioned after the inlet if desired or considered necessary.

For the removal of dust which may reach the zone between the baffles 71, the shield 70 and the wall of the chamber, two suction pipes 74 are provided, each of which is open at one end in this region and at the other end in the cleaning chamber 16, adjacent the inlet of the fan 68.

Assembly and disassembly of casing parts

The upper and lower casing parts are connected together by a number of bayonet joints, one of which is shown in FIGURES 3 and 7. Each joint comprises a pin 81 secured to a lip 82 formed on the upper casing part 10. The pin co-operates with a bayonet-slot 83 formed at the upper edge of the lower casing part, which slot is open from above to receive the pin. The casing parts may be separated by twisting the upper part 10 relative to the lower part 12 and lifting the upper casing clear, together with the impeller motor 11 and the impeller and fans secured to the shaft 63.

An interlock device is provided to prevent separation of the casing parts during operation of the conveyor. This device, which is illustrated in FIGURES 5 and 6, comprises a locking bar 84 which is mounted on the wall 13 of the lower casing part for vertical movement, that is movement axially of the casing parts. The locking bar is urged downwardly by a spring 85 into engagement with a cam 86 secured to the operating shaft 87 of a switch 88 which controls stopping and starting of the conveyor motor 41. When the switch is "On," the cam forces the locking bar 84 upwardly into engagement with a recess 89 formed in the lip 82 of the upper casing part, to prevent relative rotation between the casing parts. When the switch is "Off," the cam 86 allows the spring 85 to move the bar 84 downwardly, out of engagement with the upper casing part.

Operation

To commence operation of the machine the conveyor motor 41 and the impeller motor 11 are started. Eggs are introduced one at a time from the inlet gravity chute 18 and roll inwardly, across the concave surface of the track 21, finally resting upon the inner edge of the track and the outer edge of the rotary disc 24. The rotation of the disc 24 causes each egg to spin and to move along the track 21, with a roughly planetary motion. The egg passes through the radial baffle 71 and around the conveyor track. In its motion, the egg is subjected to the action of the flow of abrasive particles produced by the impeller, this flow acting to remove dirt, feathers and the like adhering to the egg. By virtue of its planetary motion the egg is subjected to the flow of particles on all its regions. In addition to the frictional drive imparted by the rotary disc, the movement of the eggs is controlled by the egg engaging members or fingers 27 carried by the spider 26. The action of these fingers 27 is to ensure that each egg is exposed to the cleaning flow for no more than a certain predetermined time, and also to correct any tendency for an egg to follow its orbital path without tumbling, by alternately engaging the egg to hold it against the movement of the conveyor, and releasing the egg to allow it to be moved over a short distance by its frictional engagement with the conveyor. The fingers 27 also ensure the passage of the eggs through the radial baffles 71.

As the cleaning process continues, the chamber 16 tends to become filled with dust and feathers and these are entrained in the updraught produced by the fan 67, 68 and removed. The heavier particles of abrasive material fall through this updraught when their energy is spent and pass to the bottom of the conical wall, from where they pass upwardly to the suction zone of the impeller 17 for recirculation.

When an egg has passed through nearly the complete annulus of the track it passes through the two baffles 71 located near the outlet and then reaches the region 23 of the track 21, where it rolls outwardly, under gravity, through the outlet opening to the outlet chute 19.

It will be seen that the machine can operate continuously, with ten eggs in motion on the conveyor at all times, and eggs being loaded and unloaded one at a time from the conveyor.

If it is required to clean the machine or replenish the supply of abrasive particles, the casing parts are readily separated and the disc and spider assembly easily removed.

Variations and modifications to the above described machine will of course be possible within the scope of the appended claims.

We claim:

1. An egg cleaning machine comprising, within a chamber having spaced inlet and outlet openings for eggs, a continuously operating conveyor for frictionally engaging eggs and carrying them along an arcuate path between said inlet and outlet openings, an egg turner having a plurality of projections spaced along said arcuate path at distances greater than the length of an egg and extending across said arcuate path so that when said egg turner is stationary said projections can engage and prevent movement of eggs along said arcuate path, intermittent drive means for intermittently moving said egg turner, thereby to move each said projection along a part only of said arcuate path towards said outlet opening, said intermittent drive means moving said egg turner through a succession of short arcs compared with the length of said arcuate path, and propulsive means for producing a flow of abrasive particles outwardly across said arcuate path.

2. An egg cleaning machine comprising, within a chamber having spaced inlet and outlet openings for eggs, a continuously operating conveyor for frictionally engaging eggs and carrying them along an arcuate path between said inlet and outlet openings, a plurality of egg engaging elements for positively engaging eggs on said conveyor, an intermittent drive mechanism for moving said elements in unison step-by-step along said arcuate path towards said outlet opening, and propulsive means for producing a flow of abrasive particles outwardly across said arcuate path.

3. An egg cleaning machine comprising, within a chamber having spaced inlet and outlet openings for eggs, a stationary, horizontal, annular track, a rotary disc mounted concentrically with said track, said disc and said track being adapted to support a plurality of eggs, continuous drive means for effecting continuous rotation of said disc, a rotary member concentric with said disc and said track, a plurality of eggs engaging fingers secured to said member and extending into the path of eggs on said conveyor disc and said track, intermittent drive means for rotating said rotary member step-by-step, and a centrifugal impeller located centrally of said disc and track for producing an outward flow of abrasive particles across the upper surface of said disc.

4. A machine according to claim 3, wherein said annular track has, over the major part of its circumference, a concave upper surface so that eggs supported thereon tend to roll inwardly towards said rotary disc, said track also having a region at which said upper surface dips downwardly towards the outer edge of the track, said region being located adjacent said outlet opening.

5. An egg cleaning machine comprising, within a chamber having spaced inlet and outlet openings, a stationary, horizontal annular track having a concave upper surface, a rotary disc mounted concentrically within said track and having its outer edge spaced inwardly from the inner edge of said track, said track and said disc being adapted to support a plurality of eggs, rotary drive means for continuously rotating said disc for moving said eggs by frictional engagement along an arcuate path towards said outlet opening, an annular rotary member mounted for rotatory movement concentric with said disc, a plurality of fingers on said member, said fingers extending across said arcuate path at equally spaced intervals therealong and being adapted to confine individual eggs therebetween, intermittent drive means for intermittently rotating said rotary member through short arcs compared with the length of said arcuate path whereby to move said fingers in unison step-by-step towards said outlet opening, and a centrifugal impeller located centrally of said disc and said track for producing a cleaning flow of abrasive particles outwardly across said arcuate path.

References Cited by the Examiner
UNITED STATES PATENTS

| | | | |
|---|---|---|---|
| 1,596,285 | 8/26 | Martin | 51—14 |
| 1,918,653 | 7/33 | Martin | 51—15 |
| 2,850,846 | 9/58 | Notley | 51—15 |

LESTER M. SWINGLE, *Primary Examiner.*